United States Patent
Wallther

(10) Patent No.: US 9,915,076 B2
(45) Date of Patent: Mar. 13, 2018

(54) COUPLING MEMBER FOR SCAFFOLDINGS

(71) Applicant: PlusEight Technology AB, Hindås (SE)

(72) Inventor: Harry Wallther, Hindås (SE)

(73) Assignee: PLUSEIGHT TECHNOLOGY AB, Hindås (SE)

( * ) Notice: Subject to any disclaimer, the term of this patent is extended or adjusted under 35 U.S.C. 154(b) by 597 days.

(21) Appl. No.: 14/350,761

(22) PCT Filed: Sep. 27, 2012

(86) PCT No.: PCT/SE2012/051033
§ 371 (c)(1),
(2) Date: Apr. 9, 2014

(87) PCT Pub. No.: WO2013/055280
PCT Pub. Date: Apr. 18, 2013

(65) Prior Publication Data
US 2014/0255086 A1 Sep. 11, 2014

(30) Foreign Application Priority Data
Oct. 10, 2011 (SE) ..................... 1150930

(51) Int. Cl.
*E04G 7/00* (2006.01)
*E04G 7/12* (2006.01)
(Continued)

(52) U.S. Cl.
CPC .............. *E04G 7/12* (2013.01); *E04G 7/307* (2013.01); *E04G 7/32* (2013.01); *E04G 7/34* (2013.01); *Y10T 403/42* (2015.01)

(58) Field of Classification Search
CPC .. E04G 7/12; E04G 7/307; E04G 7/32; E04G 7/34; E04G 7/22; E04G 7/308; Y10T 403/42; Y10T 403/30; Y10T 403/4645
See application file for complete search history.

(56) References Cited

U.S. PATENT DOCUMENTS

| 4,439,052 A | 3/1984 | Wallther |
| 4,445,307 A * | 5/1984 | Puccinelli ............... E04G 7/307 182/186.7 |

(Continued)

FOREIGN PATENT DOCUMENTS

| CA | 1194059 A | 9/1985 |
| CH | 660617 A5 | 5/1987 |

(Continued)

OTHER PUBLICATIONS

Photo 1 (attached with Applicant's submission Sep. 12, 2017). Photo of Prior Art Coupling Device and Scaffolding Structure (Year: 2001).*

(Continued)

*Primary Examiner* — Josh Skroupa
*Assistant Examiner* — Matthew R McMahon
(74) *Attorney, Agent, or Firm* — Morrison & Foerster LLP

(57) ABSTRACT

A coupling member includes a hook-shaped coupling part arranged to be hooked into a gripping part of an upright and a locking arrangement switchable between a locking position and a release position. Further, the locking arrangement includes a pivotally attached first clamping part and a wedge-shaped locking part, which is slidable between a locking position and a release position. The wedge-shaped locking part is arranged to push the first clamping part towards the upright and the gripping part by means of wedge action. Moreover, the first clamping part comprises two transversally spaced apart side parts which jointly define a cavity there between. The first clamping part is arranged externally on the hook-shaped coupling part, and is arranged partly within the cavity. Further, each of the side parts includes fastening means for pivotal attachment of the first clamping part to the hook-shaped coupling part.

18 Claims, 8 Drawing Sheets

(51) Int. Cl.
*E04G 7/32* (2006.01)
*E04G 7/34* (2006.01)
*E04G 7/30* (2006.01)

(56) References Cited

U.S. PATENT DOCUMENTS

| | | | | |
|---|---|---|---|---|
| 4,509,711 | A * | 4/1985 | Wallther | B63C 5/02 |
| | | | | 182/82 |
| 5,024,037 | A * | 6/1991 | Ono | E04G 7/307 |
| | | | | 403/174 |
| 5,078,532 | A * | 1/1992 | Williams | E04G 7/308 |
| | | | | 182/186.8 |
| 5,961,240 | A | 10/1999 | Bobrovniczky | |
| 6,688,430 | B1 | 2/2004 | Wallther | |
| 7,048,093 | B2 * | 5/2006 | Wallther | E04G 7/307 |
| | | | | 182/186.7 |
| 7,971,686 | B1 * | 7/2011 | Hayman | E04G 7/306 |
| | | | | 182/186.8 |
| 8,206,052 | B1 * | 6/2012 | Hayman | E04G 1/20 |
| | | | | 182/186.8 |
| 8,870,136 | B2 * | 10/2014 | Ellingboe | A63G 31/00 |
| | | | | 248/219.4 |
| 8,973,711 | B2 * | 3/2015 | Hayman | E04G 7/304 |
| | | | | 182/186.8 |
| 8,979,413 | B2 * | 3/2015 | Brinkmann | B23K 9/0026 |
| | | | | 182/186.8 |

FOREIGN PATENT DOCUMENTS

| | | |
|---|---|---|
| JP | 56-501411 A | 10/1981 |
| JP | 10-37455 A | 2/1998 |
| JP | 2002-371708 A | 12/2002 |
| JP | 2003-514149 A | 4/2003 |
| JP | 2004-519568 A | 7/2004 |
| WO | 81/01164 A1 | 4/1981 |
| WO | 1984/02371 A1 | 6/1984 |
| WO | 01/33013 A1 | 5/2001 |
| WO | 2002/22989 A1 | 3/2002 |
| WO | 2013/055280 A1 | 4/2013 |

OTHER PUBLICATIONS

Photo 2 (attached with Applicant's submission Sep. 12, 2017). Photo of Prior Art Coupling Device and Scaffolding Structure (Year: 2001).*
Extended European Search Report (includes Supplementary European Search Report and Search Opinion) received for European Patent Application No. 12840007.4, dated Mar. 2, 2015, 4 pages.
International Search Report and Written Opinion received for PCT Patent Application No. PCT/SE2012/051033 dated Oct. 17, 2012, 11 pages.
International Preliminary Report on Patentability received for PCT Patent Application No. PCT/SE2012/051033 dated Apr. 24, 2014, 8 pages.
Office Action received for Japanese Patent Application No. 2014-535692, dated Aug. 31, 2016, 5 pages (English Translation).

* cited by examiner

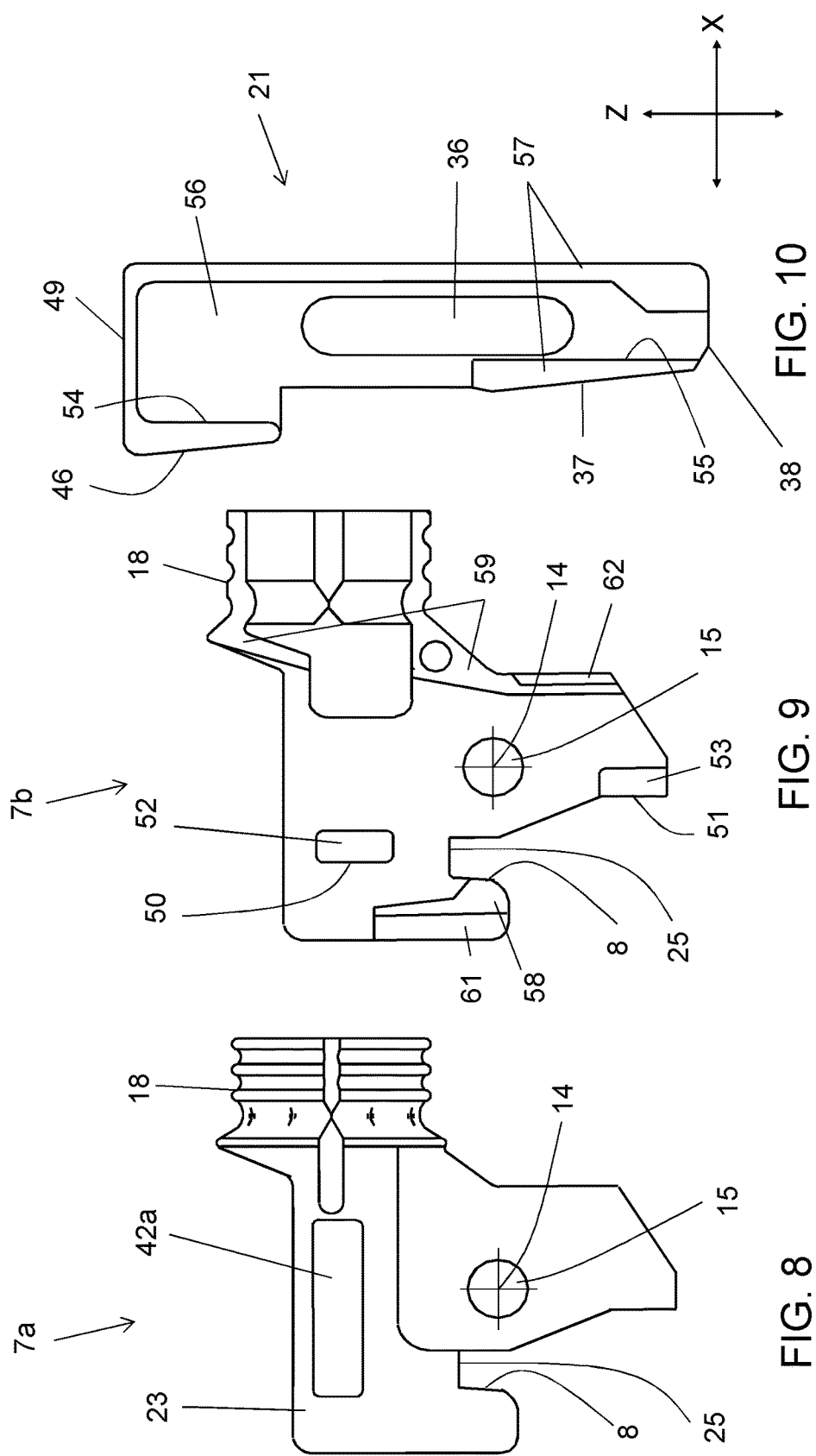

COUPLING MEMBER FOR SCAFFOLDINGS

CROSS REFERENCE TO RELATED APPLICATIONS

This application is a U.S. National Phase patent application of PCT/SE2012/051033, filed on Sep. 27, 2012, which claims priority to Swedish Patent Application No. 1150930-4, filed on Oct. 10, 2011, each of which is hereby incorporated by reference in the present disclosure in its entirety.

TECHNICAL FIELD

The present invention pertains to a coupling member for coupling together scaffolding elements and uprights in a scaffold structure.

BACKGROUND ART

Scaffoldings are temporary structures built around construction sites/buildings or the like to support workers and materials. Scaffoldings in early days were built of wood and bamboo and pieces of rope were used to secure the components. In present day, scaffoldings are made up of iron pipes/tubes and mechanical coupling members are used to secure these pipes/tubes. Several such coupling members in numerous configurations are available in the market to choose from. Further, there are several criteria for selecting a coupling member, but the ease of use, reliability and safety matters the most.

For example, WO 02/22989 shows a coupling member previously known in the art. This coupling member comprises a hook-shaped main body, a locking wedge, a pivoting lower clamping member and a slidable upper clamping member. This design however involves problems with respect to coupling rigidity, robustness, reliability, and high safety.

There is thus a need for a new and improved coupling member which will overcome the problems associated with the existing coupling members.

SUMMARY

Among others, the object of the present invention is to provide an inventive coupling member for coupling scaffolding elements to uprights in a scaffold or the like where the previously mentioned problems are at least partly avoided. The coupling member has a longitudinal direction and a transversal direction.

Further, the coupling member comprises a hook-shaped coupling part arranged to be hooked into a gripping part of said upright, and a locking arrangement switchable between a locking position, in which said coupling member may be secured to said upright and, and a release position, in which said coupling member may be released from said upright. Further, the locking arrangement comprises a first clamping part that is pivotally attached to said hook-shaped coupling part about a pivoting axis, and which, in said locking position, is arranged to interact with at least one of said upright and said gripping part for tightening the coupling between said coupling member and said upright. Furthermore, the locking arrangement comprises a wedge-shaped locking part which is slidable between a locking position and a release position. The movement of the wedge-shaped locking part, from said release position to said locking position results in motion of said first clamping part towards at least one of said upright and said gripping part.

At least part of the object of the invention is achieved by the features that the first clamping part of the coupling member comprises two transversally spaced apart side parts which jointly define a cavity therebetween, and that said side parts are pivotally attached to the hook-shaped coupling part externally, such that the hook-shaped coupling part is partly within said cavity.

In the prior art design of WO 02/22989, the pivoting lower clamping member is arranged in the main body of the coupling device, thereby limiting the dimension of the pivoting lower clamping member, because the shape and form of the lower clamping member is directly dependent on the space available inside the hook-shaped body. This limitation in space results in a limited strength and robustness of the pivoting clamping member. The inventive first clamping part, with its externally arranged and transversally spaced apart side parts, provides improved strength and robustness of the pivoting clamping part itself, due to reduced limitation in dimension and type of material used for the first clamping part, thereby leading to improved possibilities of robust design and high safety. Furthermore, the increased width of interaction between the first clamping part and the upright due to the increased width of the first clamping part itself by means of the large transversal distance between the side portions results in a more rigid coupling between coupling member and the upright, in particular an increased torsional rigidity around the longitudinal axis of the coupling member.

Further, the hook-shaped coupling part may comprise a resting surface which in the use position faces downwards and is arranged to interact with said gripping part of said upright. The pivoting axis may in the use position be arranged below said resting surface of said hook-shaped coupling part. This arrangement has the advantage of providing a relatively compact first clamping part, which consequently also is more robust and stable, because the distance from the pivoting axis to the remote end of the hook-shaped coupling part is reduced. Moreover, the relatively low position of the pivoting axis results in improved automatic motion towards a release position upon withdrawal of the wedge-shaped locking part, due to increased angular motion of the first clamping part between a release position and locking position of the first clamping part, and thus to a higher gravitational torque exerted on the first clamping part in the locked position.

Each of the two transversally spaced apart side parts may comprise a tightening surface for interaction with at least one of said upright and said gripping part. By providing each side part with a tightening surface directly, fewer parts are required and a more cost-effective manufacturing of the coupling member is achieved.

The first clamping part may further comprise a connector part that is fixedly connected to the transversally spaced apart side parts, such that a single rigid first clamping part is formed. This subject-matter provides the advantage of a strong first clamping member, and where mutual position between the side parts is fixed for the purpose of efficient pivoting motion of the first clamping member.

The wedge-shaped locking part is preferably arranged to be supported by a portion of said first clamping part in said release position. This arrangement eliminates the need for extensive withdrawal of the wedge-shaped locking part from the hook-shaped coupling part, and allows instead the wedge-shaped locking part to remain very close to a use position, leading to a fast and efficient handling of the coupling member. Moreover, by providing the support by the first clamping part itself, the forward motion of the first clamping part, for example upon actuation of the user, automatically results in removal of said support, and thereby motion of the wedge-shaped locking part towards the locking position.

The first clamping part may further comprise a wedge rest part that is fixedly connected to said connector part, wherein said wedge rest part may comprise a resting surface for letting the wedge-shaped locking part rest on in an unlocked position of the coupling member. The wedge rest part provides a safe and reliable support surface for the wedge-shaped locking part, thereby improving handling of the coupling device during assembly and disassembly of scaffolds.

The locking arrangement may further comprise a second clamping part, which is fixed to the upper portion of said hook-shaped coupling part, wherein the second clamping part slidably interacts with said hook-shaped coupling part. This subject-matter provides the advantage of an even more rigid coupling between the coupling member and upright due to distribution of clamping forces of the locking arrangement on both upper and lower side of the hook. The second clamping part also eliminates any residual play that might otherwise still exist.

Moreover, said second clamping part may be slidable between a locking position and a release position, and the wedge-shaped locking part may be arranged to, by means of wedge action, push the second clamping part towards said upright for interaction therewith upon motion of said wedge-shaped locking part from said release position to said locking position.

Preferably, the said second clamping part comprises two side portions, and said second clamping part is slidably coupled through the two side portions to a pair of external recesses provided on the hook-shaped coupling part. This coupling arrangement of the second clamping part to the hook-shaped coupling part has the advantage of being simple and reliable, as well as allowing a compact and strong design of the second clamping part. No portion of the second coupling part interacts with the pivoting axis, and the second clamping part may be mirror-symmetrical for more reliable function.

The said first and second clamping parts may be separately mounted on said hook-shaped coupling part, and free from direct mutual contact. This arrangement has the advantage of eliminating any negative interaction between the first and second clamping parts during motion thereof, contrary to the prior art design, where both clamping members are attached to the pivot axis of the hook-shaped coupling part.

Further, the wedge-shaped locking part may comprise an elongated hole, which extends essentially in a longitudinal direction of the wedge-shaped locking part. This arrangement has the advantage of securing the wedge-shaped locking part to the hook-shaped coupling part without impairing the sliding motion thereof. Preventing any part of the coupling member from detaching is an important safety aspect of the coupling member, because parts of the coupling member might otherwise fall down onto a person or object during or after assembly/disassembly. The locking wedge is preferably connected with the hook-shaped coupling part through this hole by a rivet.

Each of said transversally spaced apart side parts may be formed of a metal plate. The forming of the side parts in a sheet metal process allows for cost-efficient production and sturdy construction. The parts manufactured this way are more robust than parts made by casting.

The hook-shaped coupling part may be formed of two hook-shaped side parts that are joined together. This arrangement has the advantage of allowing said side parts be manufactured from sheet steel, which after a cutting and bending process are joined by welding, or the like. Consequently, a more cost-efficient production and sturdy construction is achieved.

Further, said wedge-shaped locking part may be arranged partly between said two hook-shaped side parts of said hook-shaped coupling part, and said wedge-shaped locking part may be arranged partly within said cavity of said first clamping part. This arrangement has the advantage of providing protection of the wedge-shaped locking part from external undesired operation thereof. It is important that the locking arrangement only enters the release position upon operation of the user, and never due to unforeseen interaction with other parts of the scaffolding or persons using it. Moreover, the inventive arrangement of the wedge-shaped locking part results in increased symmetry of the coupling member, and thus improved reliability.

Further, the gripping part of a said upright has a resting surface which in the use position faces upwards. The hook-shaped coupling part also has a resting surface which in the use position faces downwards. The hook-shaped coupling part is arranged to be supported by the interaction between said resting surfaces.

Furthermore, the gripping part may have a second tightening surface present on the outer periphery of said gripping part, which in the use position faces partly downwards, and said first clamping part may comprise tightening surfaces that faces at least partly upwards in the locked position. Said coupling member may be tightened in locked position by interaction between the second tightening surface of said gripping part and the tightening surfaces of said first clamping part.

BRIEF DESCRIPTION OF THE DRAWINGS

In the following section, the invention will be described in a greater detail with reference to the embodiment shown by the enclosed figures. It should be emphasised that the embodiment shown is used for example purposes only and should not be used to limit the scope of the invention.

FIG. 8 shows an outside side view of a side part of the hook-shaped coupling part;

FIG. 9 shows an inside side view of a side part of the hook-shaped coupling part; and FIG. 10 shows a side view of the wedge-shaped locking part.

DETAILED DESCRIPTION

Figure 1:
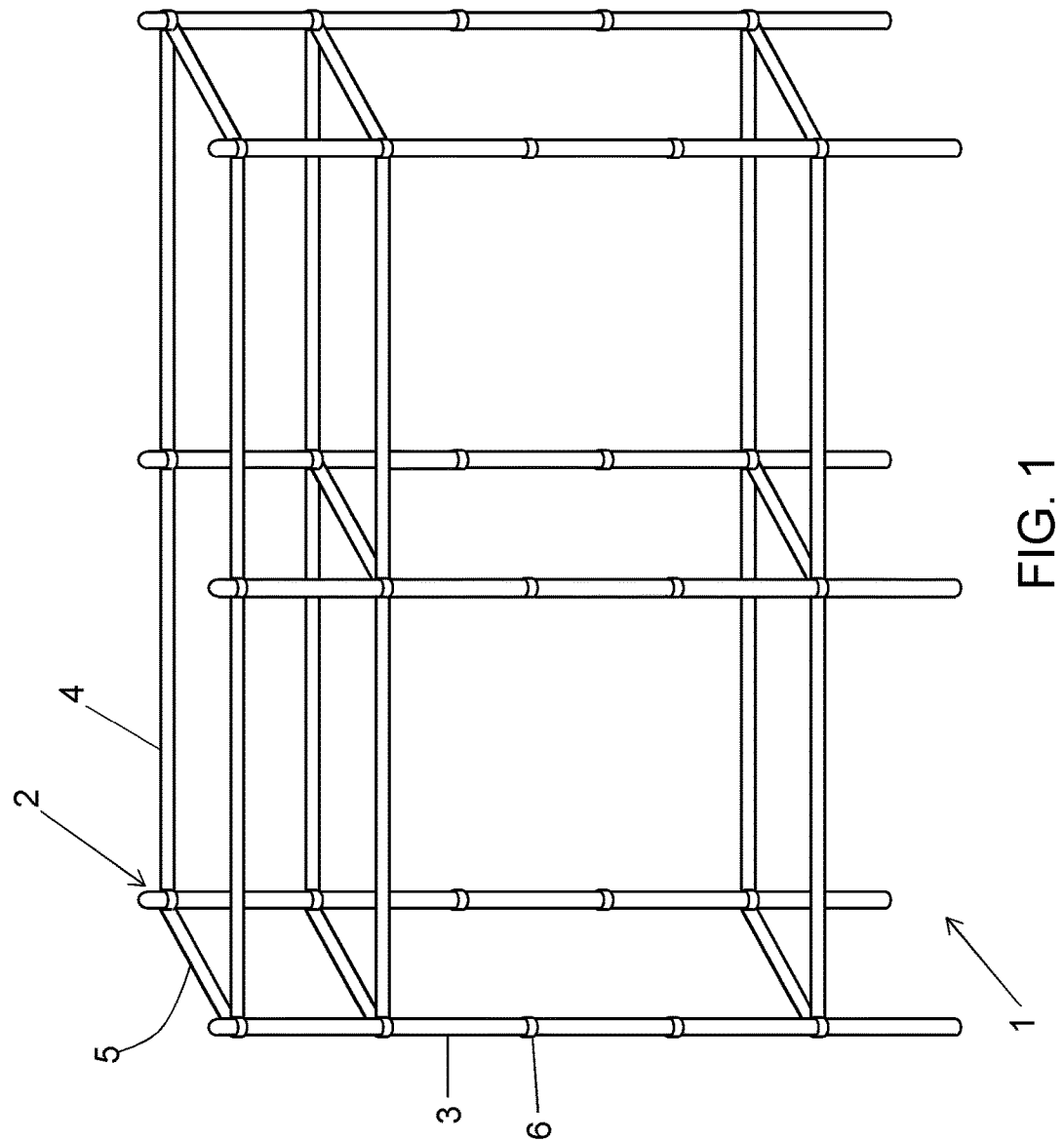
FIG. 1 shows an example of a scaffold in which the present invention can be used.

FIG. 1 shows an example of a scaffolding 1 that is equipped with coupling members 2 which can be of the type as described by the present invention. The scaffolding 1 comprises a number of uprights 3 also known as standards which are essentially vertically oriented tubes and a number of scaffolding members 4, 5 which are essentially horizontally oriented tubes and are also known as ledgers. Further, the uprights 3 and the scaffolding members 4, 5 are coupled with each other by the coupling member 2 of the present invention to form the scaffolding 1. The uprights 3 rest at their lower end on a surface which can be the ground, a sidewalk, a floor or the like. The scaffolding elements 4, 5 are at their both ends coupled to the uprights 3 by means of the coupling members 2. The coupling member 2 according to the invention is an extremely rigid coupling and is capable of providing a scaffold that stands alone without external support. However, in traditional applications, when the scaffolding 1 is positioned near a building it is usually fastened to the building for safety and stability reasons. The traditional scaffolding 1 has as its object to support building platforms, which usually rest between the horizontal scaffolding members 4, 5 but the scaffolding 1 can have a number of various applications and functions, such as, for example, forming a stage, scaffolding at various events, to support weather shelters for people, vehicles, boats, buildings, to support signs or to form a so-called brace to support cast constructions during building. Further, the uprights 3 have at regular intervals over their length a number of gripping parts 6. The gripping parts 6 are generally bowl/cup shaped and are welded or attached to the body of the uprights 3 in any manner known in the art. Furthermore, as the gripping parts 6 are arranged over the length of the uprights 3 at different locations, the coupling of the scaffolding elements 4, 5 can also be done at various locations for various height related purposes.

Apart from the horizontal scaffolding elements 4, 5 which form a supporting part of the scaffolding 1 as a whole, it is possible that the coupling device 2 according to the invention is used for the suspension of special scaffolding elements for special purposes, for example for anchoring lifting devices or other aids for carrying out a specific kind of work. In such cases, such scaffolding elements do not need to be elongated or horizontal, and can in certain cases be retained at a single upright 3, and be coupled to one or more gripping parts 6. The scaffolding elements can, alternatively, consist of so-called lattice rails, which form rails and protection from falling. Further, several horizontal scaffolding elements 4, 5 can be coupled to one upright 3 by means of one and the same coupling member 2. Now the detailed construction and working of the coupling member 2 will be described below.

Figure 2:
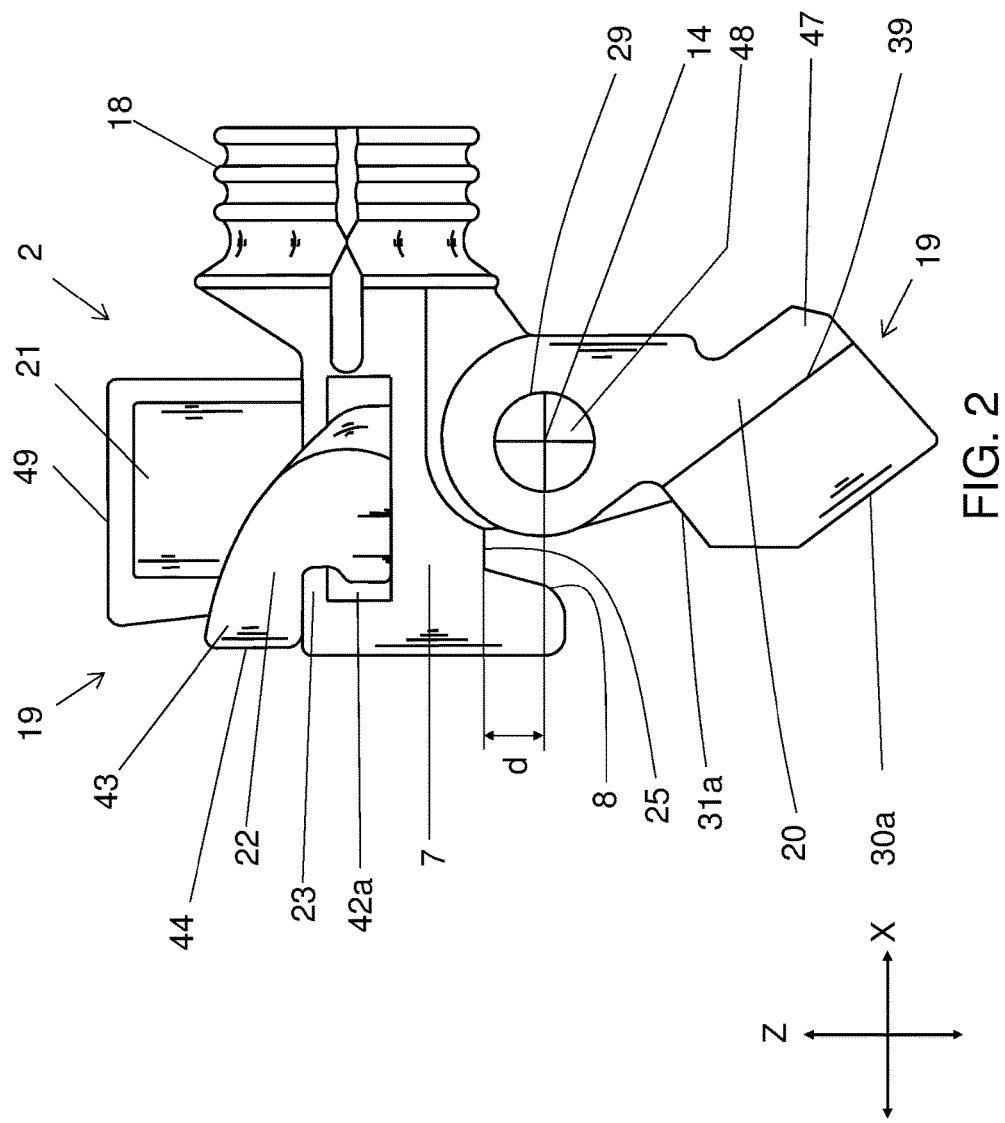
FIG. 2 shows a side view of the coupling member according to the invention in a released/unlocked position.
Figure 3:
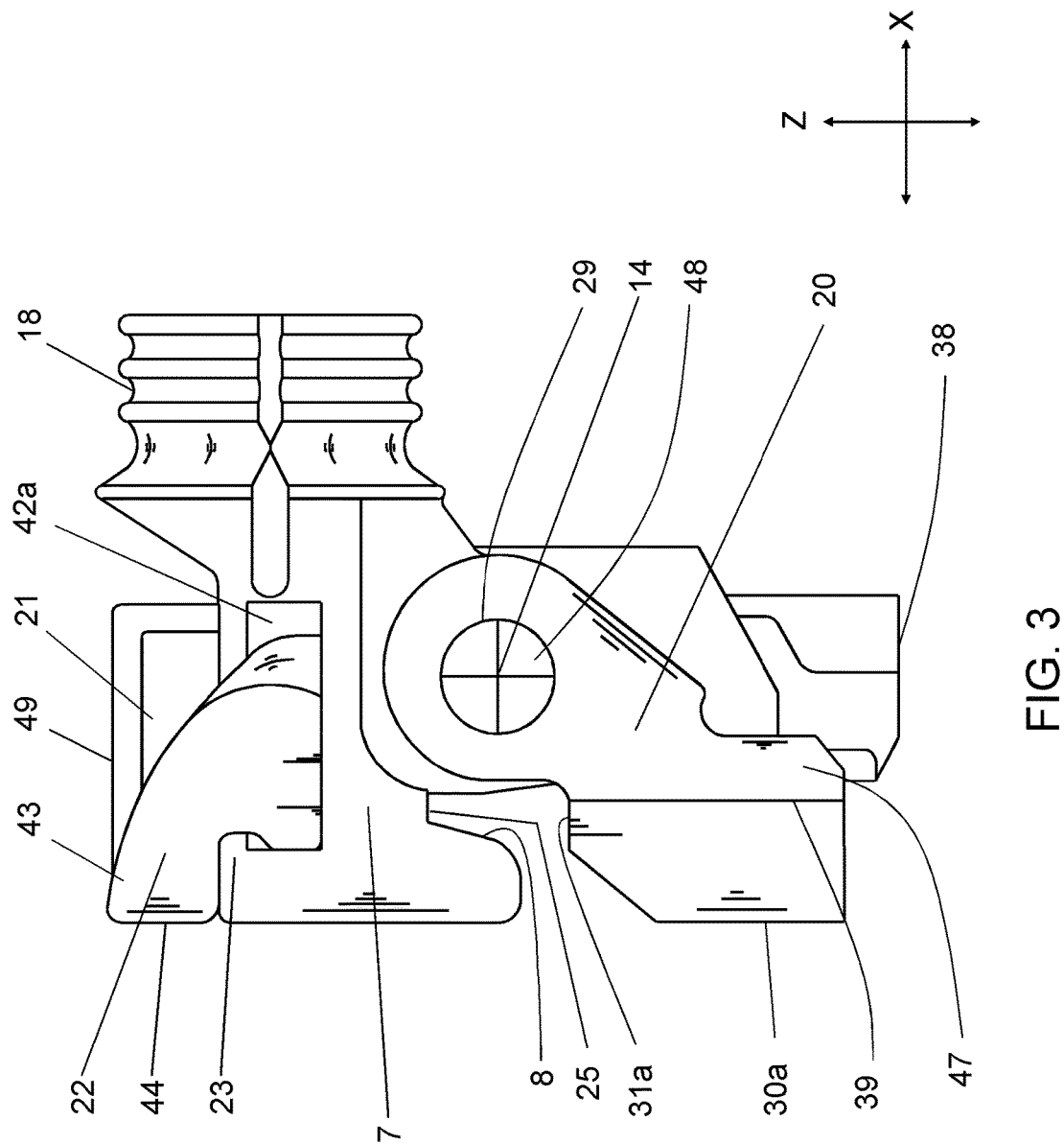
FIG. 3 shows a side view of the coupling member according to the invention in a locked position.
Figure 4:
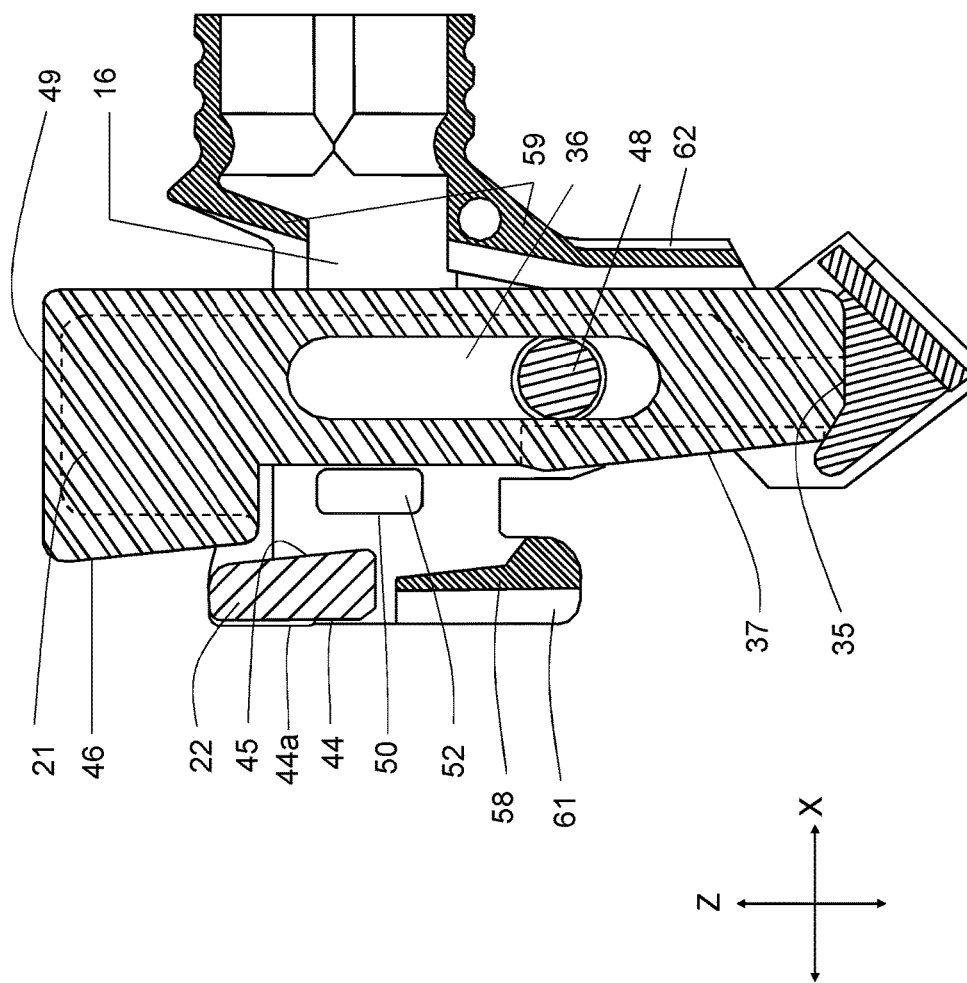
FIG. 4 shows a partial cross section of the coupling member according to the invention in a released/unlocked position.
Figure 5:
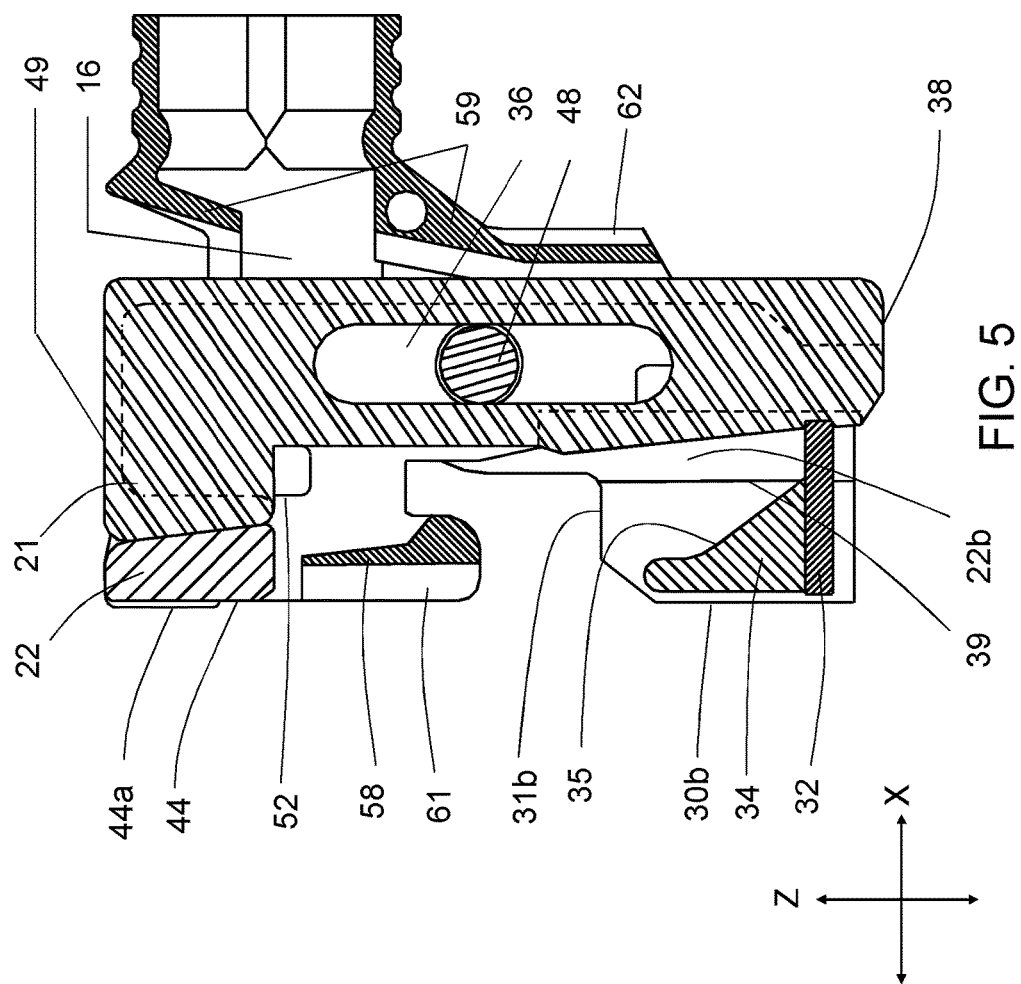
FIG. 5 shows a partial cross section of the coupling member according to the invention in a locked position.
Figure 6:
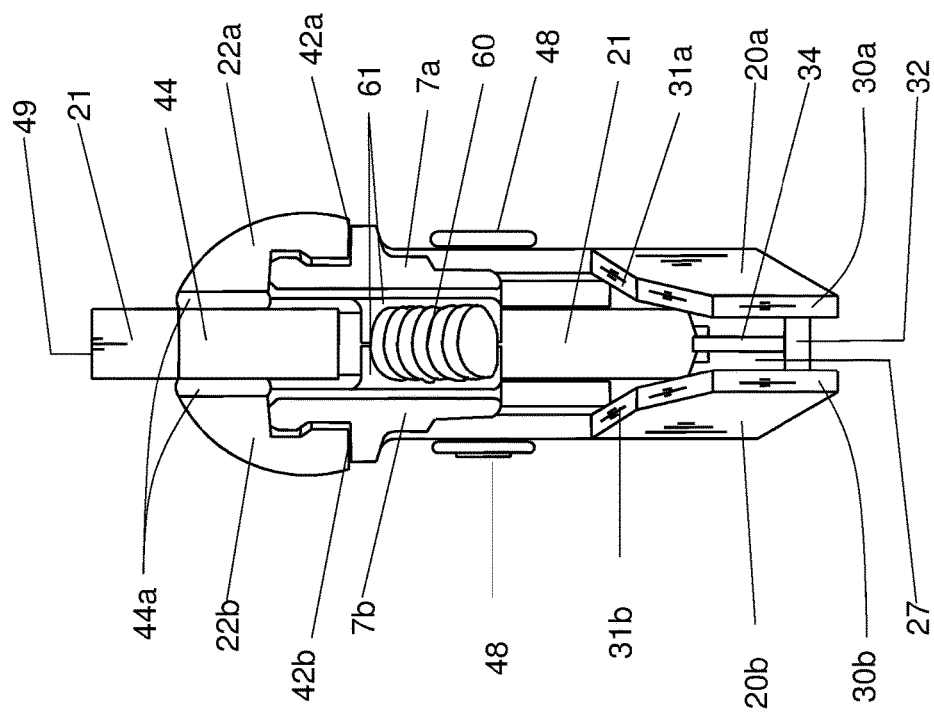
FIG. 6 shows a front view of the coupling member according to the invention.
Figure 7:
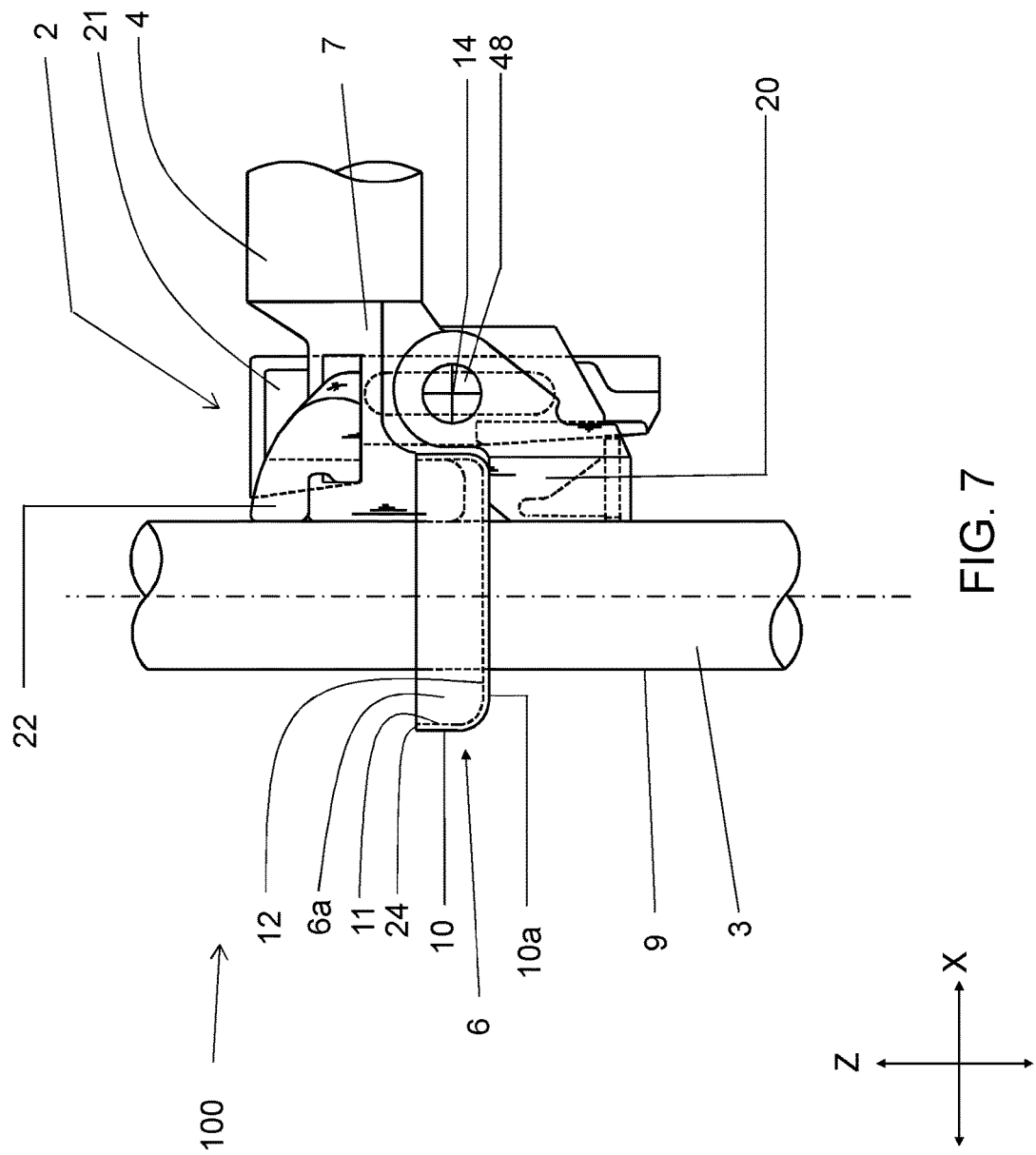
FIG. 7 shows a side view of the coupling system according to the invention with the coupling member in a locked position with one upright and one ledger.

FIGS. 2-10 show in detail the construction of the coupling member 2. The coupling member 2 has a longitudinal direction X, a transversal direction Y, and a height direction Z. In a use position of the coupling member 2, both the longitudinal direction X and the transversal direction Y of the coupling member 2 are more or less adapted to be arranged in a horizontal plane, and the height direction Z of the coupling member 2 is more or less adapted to be arranged along a vertical direction. This arrangement of the coupling member 2 assures the correct and safe function of the coupling member 2 in the use position, because the coupling member uses gravity for proper function. A certain deviation, for example +/−20 degrees, from the exact horizontal/vertical arrangement of the coupling member 2 in the use position does however not result in any significant negative functional aspects. The coupling member 2 comprises a hook-shaped coupling part 7 which is the backbone of the coupling member 2 as all other component parts are arranged/assembled onto it. The hook-shaped coupling part 7 has a resting surface 25, which is laterally limited in a forward direction by a gripping surface 8 that are formed to grip the gripping part 6 of the upright 3. The resting surface 25 of the hook-shaped coupling part 7 define together with the gripping surface 8 partly a recess that in the use position of the coupling member is opened downwards. This recess is configured to receive an upwards projecting wall 10 of the gripping part 6. The hook-shaped coupling part 7 is here made of two nearly mirror-symmetric side parts 7a, 7b that joined together form the hook-shaped coupling part 7. The contact surface between the two side parts 7a, 7b coincide with a first plane that is perpendicular to the transversal direction Y, and located in a centre of the coupling member 2 in the transversal direction Y. Upon joining the two side parts 7a, 7b, a front wall 58 and rear wall 59 of one side part 7a, 7b contacts a corresponding front wall 58 and rear wall 59 of the other side part 7a, 7b, and the side parts 7a, 7b are welded together by welds 60 at chamfered front and rear wall portions 61, 62 of each side part 7a, 7b formed by said front and rear walls 58, 59. Each side part 7a, 7b exhibits a hole 15 through which a transverse pivoting axis 14 extends, and which is arranged to receive a rivet 48 for holding the coupling member 2 together. As illustrated in FIG. 2, the pivoting axis 14 is in the use position arranged below the resting surface 25 of said hook-shaped coupling part 7 with a distance d in the height direction Z of the coupling member 2. As shown in FIGS. 4, 5, the hook-shaped coupling part 7 exhibits a through-going cavity 16 which extends from the top and continues downwards in the height direction Z of the hook-shaped coupling part 7. Further, partly within the through-going cavity 16 is a wedge-shaped locking part 21 arranged. The hook-shaped coupling part 7 also comprises a fastening portion 18 to couple for example a horizontal tube 4, as shown in FIG. 7. The resting surface 25 is situated at a forward end in the longitudinal direction of the coupling member 2 and the fastening portion 18 is situated at a rearward end in the longitudinal direction of the coupling member 2. Forward of the coupling member 2 hereinafter refers to the direction towards the upright 3 in the engaged position.

The coupling member 2 further comprises a locking arrangement 19, which includes a first clamping part 20, second clamping part 22, and a wedge-shaped locking part 21. The wedge-shaped locking part 21 is slidably arranged in the through-going cavity 16 present in the hook-shaped coupling part 7. The wedge-shaped locking part 21 can simply be referred to as a locking wedge 21 and both terms will be referred interchangeably hereafter. The second coupling part 22 is in the use position arranged on an upper portion 23 of said hook-shaped coupling part 7. Further, the first and second clamping parts 20, 22 are separately mounted on the hook-shaped coupling part 7 and are thus free from direct mutual contact for the purpose of eliminating any negative mutual interference during locking or release motion.

Now, the constructional details and the interaction of the hook-shaped coupling part 7 and the locking arrangement 19 with the upright 3 will be discussed in detail. FIG. 7 shows in detail the interaction of the coupling member 2 in a locked position with an upright 3 and a ledger 4 coupled to it. As mentioned above, the hook-shaped coupling part 7 has a resting surface 25 laterally limited by the gripping surface 8 which is formed to engage and grip the gripping part 6 of the upright 3. Moreover, the bowl/cup-shaped gripping part 6 is fixedly attached to the upright 3, in more detail to its enveloping surface 9, which in the example shown is cylinder-shaped, but in principle can be of a shape with corners, for example a square pipe, or in principle a massive rod. In the figure shown, the gripping part 6 exhibits a wall 10 which extends around the enveloping surface 9 of the upright, with a first tightening surface 11 facing inwards towards the upright 3. The first tightening surface 11 extends in the disclosed embodiment of the invention concentrically with the upright 3, i.e. with a constant distance around the upright 3 from the enveloping surface 9 of the upright 3, but many other shapes of the gripping are possible, facilitating for example a curved first tightening surface. The gripping part 6 further exhibits a bottom 12 which advantageously exhibits not shown drainage holes for water, particles, and the like. In principle, the bottom 12 of the gripping part 6 may be eliminated, such that the cylindrical wall 10 alone is connected to the enveloping surface 9 of the upright 3 by means of stress absorbing distance elements. Moreover, the gripping part 6 may alternatively be formed by a disc with circumferentially spaced apart holes for receiving the coupling member 2, or by a plurality of brackets secured to the upright at different angular positions. The gripping part 6, regardless of its shape, forms a continuous or intermittent space 6a positioned between the first tightening surface 11 and the enveloping surface 9 of the upright 3 for receiving a downwards protruding hook of the coupling member 2. In particular increased assembly and disassembly safety is provided by means of a hook-shaped coupling part that is arranged to be inserted into a an upwards facing cavity of the gripping part, because the coupling member 2 may, prior to activation of the locking arrangement 19, be temporarily coupled to the gripping member 6 with a relatively high coupling safety. This configuration often occurs during assembly and disassembly of the scaffold 1.

A forward end of the hook-shaped coupling part 7 is arranged to, when the coupling member 2 is assembled, protrude downwardly into the space 6a of the gripping part 6 in order to engage it and be supported by it. As can best be seen from FIG. 7, the gripping part 6 exhibits an upwardly facing resting surface 24 which is formed by the upwards facing ring-shaped, in the example shown circular, edge of the wall 10. This forms a resting surface 24, which is arranged to interact with a downwardly, facing similarly shaped resting surface 25 of the hook-shaped coupling part 7. The resting surfaces 24, 25 are advantageously plane, and in the example extend in a plane perpendicular to the height direction Z. The first tightening surface 11 of the gripping part 6 is intended to interact with a gripping surface 8 of the hook-shaped coupling part 7. Each side part 7a, 7b of the hook-shaped coupling part exhibit a gripping surface 8. The gripping surface 8 faces in the engaged position of the coupling member 2 away from the upright 3, and towards the first tightening surface 11 of the gripping part 6. Although this cannot be clearly seen, the gripping surface 8 is also advantageously curved, in more detail it is convexly curled with essentially the same shape as the first tightening surface 11 of the gripping part 6, by means of which surface contact is assured.

Referring to FIGS. 2-5 & 8-10 for the detailed construction of the locking arrangement 19. The first clamping part 20 is formed of two separate transversally spaced apart side parts, preferably steel plates, 20a, 20b that are joined together. At least first portions of the side parts 20a, 20b are flat and extend in parallel planes, and second portions of the side parts 20a, 20b, separated from the first portions by a fold line 39, are flat and being inclined towards each other, each preferably being directed towards a central longitudinal axis of the upright 3. Due to their spaced apart relationship, the side parts 20a, 20b jointly define a cavity 27 between said side parts 20a, 20b, as best shown in FIG. 6. The cavity 27, or hollow space, is thus in the transverse direction Y limited by the side parts 20a, 20b. The cavity 27 is nearly hollow before assembly on the finished coupling member, after which both the wedge-shaped locking part 21 and the hook-shaped coupling part 7 are at least partly arranged within said cavity 27. The first clamping part 20 is arranged externally on the side parts 7a, 7b of the hook-shaped coupling part 7. By this arrangement, the hook-shaped coupling part 7 will be arranged partly within the said cavity 27. Further, each of the two transversally spaced apart side parts 20a, 20b comprises fastening means 29 for pivotal attachment of the two transversally spaced apart side parts 20a, 20b to the hook-shaped coupling part 7 about the transverse pivoting axis 14. The fastening means 29 is here formed by a hole in each side part 20a, 20b arranged to receive a rivet 48, but many other configurations of the pivotal connection is possible, such as using a threaded member instead of rivet, or providing a rivet/pin directly to one of the side parts 20a, 20b of the first clamping part 20. The rivet 48 is further arranged to engage the through-going hole 15 of each side part 7a, 7b of the hook-shaped coupling part. The axis of each hole 15 is essentially aligned with the transverse pivoting axis 14. The fastening means 29 is used to pivotally fasten the two transversally spaced apart side parts 20a, 20b with the hook-shaped coupling part 7.

Each of the two transversally spaced apart side parts 20a, 20b exhibits, in the locked position, forwardly facing tightening surfaces 30a, 30b, as best shown in FIG. 6, for interaction with the enveloping surface 9 of the gripping part 6 of the upright 3. Further, the forwardly facing tightening surface 30a, 30b is exhibited in a lower portion of each transversally spaced apart side part 20a, 20b. Each of the two transversally spaced apart side parts 20a, 20b further exhibits, in the locked position, essentially upwardly facing tightening surfaces 31a, 31b for interaction with an external, second tightening surface 10a of the gripping part 6. The upwardly facing tightening surfaces 31a, 31b are exhibited above the forwardly facing tightening surface 30a, 30b in the use position. Moreover, the transversally spaced apart side parts 20a, 20b are joined together at a lower portion of the side parts 20a, 20b and adjacent to the forwardly facing tightening surfaces 30a, 30b by a connector part 32 such that a single rigid first clamping part is formed. The connector part 32 is preferably formed by a metal plate that is welded to each of said side parts 20a, 20b. Additionally, a wedge rest 34 is fixedly connected to the connector part 32 in order to provide a first resting surface 35 for the locking wedge 21, as best shown in FIGS. 4, 5. The locking wedge 21 rests on this wedge rest 34 whenever the coupling member 2 is in an unlocked position, as best shown in FIG. 4. Alternatively, the connector part 32 and wedge rest 34 may be formed of a single piece, and the transversally spaced apart side parts 20a, 20b may alternatively be formed of a single piece.

In order to lock the coupling member 2 on to the upright 3, the first clamping part 20 is pivoted about the transverse pivoting axis 14 and the in the locked position forwardly facing tightening surfaces 30a, 30b are brought in contact with the enveloping surface 9 of the gripping part 6 as mentioned above. Further, in the locked position upwardly facing tightening surfaces 31a, 31b come in contact with the second tightening surface 10a of the gripping part 6. Therefore, in the manner explained above the first clamping part 20 is able to push the hook-shaped coupling part 7 rearwardly and downwardly, thereby providing an extremely rigid, play free and safe coupling, where the risk of unintentional disengagement of the coupling member 2 is nearly eliminated.

Referring in particular to FIGS. 9 and 10 for describing the form and function of the locking wedge. The locking wedge 21 is essentially designed as a wedge and has at least a first wedge surface 37. The first wedge surface 37 faces forwards in the use position, and is formed to push the first coupling part 22 towards the upright by engaging the connector part 32, which is fixed to the transversally spaced apart side parts 20a, 20b. The locking wedge 21 comprises an elongated hole 36, which extends essentially in the longitudinal direction X of the locking wedge 21. As mentioned above, the locking wedge 21 is disposed in the through-going cavity 16 present in the hook-shaped coupling part 7 and is connected to it about the transverse pivoting axis 14 by passing the rivet or pin 48 through the elongated hole 36 of the locking wedge 21, and the holes 15 of the hook-shaped coupling part 7. The locking wedge 21 can freely move upwards and downwards inside the through-going cavity 16 and the level of displacement in both the sliding directions is restricted partly by the length of the elongated hole 36. The locking wedge 21 exhibits at a lower end 38 thereof a downwardly wedge-shaped decreasing dimension in the longitudinal direction of the coupling member 2.

Further, in order to achieve the required wedge-action, the locking wedge 21 is supported rearwards by a first and second forward facing support surfaces 50, 51, which are oppositely provided on each side part 7a, 7b of the hook-shaped coupling part 7, and which upon tightening of the coupling member 1 are arranged to interact with first and second rearwards facing tightening surfaces 54, 55 of the locking wedge respectively. Each side part 7a, 7b is thus provided with a first forward facing support surface 50, which is arranged on a first support projection 52 that projects a certain distance in the transverse direction Y towards a centre of the hook-shaped coupling part 7, and second forward facing support surface 51, which is arranged on a second support projection 53 that projects a certain distance in the transverse direction Y towards a centre of the hook-shaped coupling part 7. The first support projections 52 of the side parts 7a, 7b are arranged oppositely in the transverse direction Y, and they are transversely spaced apart with a distance larger than the thickness of a central portion 56 of the locking wedge 21, but smaller than a thickness of a peripheral flange portion 57, which extends along the main part of the locking wedge 21 periphery. Thereby, first and second support projections limit the freedom of motion of the locking wedge 21 in a longitudinal direction X of the coupling member 1. The increased thickness of the peripheral flange portion 57 compared with the thickness of the central portion 56 of the locking wedge 21 also serves the purpose of increasing the strength of the locking wedge 21, as well as preventing the lower end 38 and top part 49 of the locking wedge from deforming and flattening due to repeated blows by a hammer, or the like.

The position of the first and second support projections 52, 53 is arranged relatively close to the first and second wedge surfaces 38 in the longitudinal direction X respectively for the purpose of reducing the risk of undesired motion of the locking wedge 21 towards the release position upon large magnitude bending torque acting on the coupling member 1. Preferably, both the first and second forward facing support surfaces 50, 51 are positioned forwards of the pivoting axis 14.

Referring to FIGS. 2-6 for describing the construction of the second clamping element 22. As mentioned above, the second clamping part 22 in the use position is arranged on an upper portion 23 of said hook-shaped coupling part 7. The second clamping part 22 is formed as a single piece and comprises two side portions 22a, 22b, which are slidably coupled on to a pair of external recesses 42a, 42b that are provided on the hook-shaped coupling part 7. The two side portions 22a, 22b of the second clamping part can be clearly seen in the FIG. 6 which shows the front view of the coupling member 2. The second clamping part 22 further exhibits a front part 43 that protrudes towards the upright and exhibits a forward facing tightening surface 44, as best shown in FIG. 6, which is arranged to form a tightening surface 44 towards the upright 3 above the gripping part 6. In this way, even further improved coupling rigidity and stiffness of the coupling member 2 in its locked position is assured. The tightening surface 44 of the second clamping member 22 preferably comprises lateral ridges 44a that projects a certain distance forward compared with a central region of the tightening surface 44. The lateral ridges 44a extend in the height direction Z of the coupling member 2, and are arranged to contact the upright 3 in the locked position, thereby giving the second clamping part 22 an extended circumferential contact surface with the upright, resulting in further improved coupling rigidity. In addition, the second coupling part 22 exhibits a rearwardly facing tightening surface 45 which is arranged to be tightened by interaction with a forwards facing sloped second wedge surface 46 of the locking wedge 21, as best shown in FIG. 4. The first and second wedge surfaces 37, 46 give the locking wedge 21 its characteristic double wedge surfaces.

In operation, whenever a user, for example a construction worker intends to build a scaffold 1, he uses the coupling member 2 in an unlocked position. In case the coupling member 2 initially is in a locked position, or an intermediate position, the unlocked position of the coupling member 3 may easily be attained by simply turning the coupling member 3 upside down, whereupon the locking wedge 21 falls down due to gravity to a release position and the first clamping part 20 pivots back to the open position. Upon rotating the coupling member back to the use position, the coupling member 2 is kept in the unlocked position due to the secure locking wedge support within the first clamping part 20. The user subsequently affixes the gripping surface 8 of the hooked-shaped coupling part 7 to the gripping part 6 of the upright 3, and allows the resting surface 25 of the hook-shaped coupling part 7 to be supported by the resting surface 24 of the gripping part 6. The assembly of the coupling member 2 in the unlocked/released position can be best seen in the FIGS. 2 & 4. Thereafter, the locking arrangement 19 is activated. Activation is advantageously performed by simply pushing the first clamping part 20 towards the upright 3. The movement of the first clamping part 20 may be done by means by a manual activation by the user, for example by means of blows using a conventional hand tool such as a hammer against a rear portion 47 of the first clamping part 20.

In doing so, the resting surface 35 of the first clamping part 20 is removed from the position below the locking wedge 21, which consequently due to gravity and weight of the locking wedge 21 will fall down into the locking position, see FIGS. 3, 5, 6 & 7. Upon falling down towards the locked position, the first wedge surface 37 engages the first clamping part 20, and the second wedge surface 46 engages the second clamping part 22, to move said first and second clamping parts 20, 22 into the locking position. A wedge interaction will thus be caused since the locking wedge 21 obtains support rearwards with its first and second rearwards facing tightening surfaces 54, 55 in contact with the first and second forwards facing support surfaces 50, 51 of each side part 7a, 7b of the hook-shaped coupling part 7, as well as a combination of the rivet 48, the elongated recess 36 of the locking wedge 21, and the holes 15 of the hook-shaped coupling part 7. Thereafter, in order to finally secure the coupling member 2 to the upright 3, a blow to the top part 49 of the locking wedge 21 using a conventional hand tool such as a hammer is preferably performed. The coupling member 2 is now in a rigid coupled mode with the upright 3 and the horizontal scaffolding element 4. This rigid coupled mode can be seen as a coupling system 100 in the FIG. 7. The first clamping part 20 has been illustrated with several different tightening surfaces 30a, 30b, 31a, 31b, but it is noted that also other shapes of the tightening surface is realizable.

Release actuation of the coupling member 2 is done in an analogous but opposite manner. The locking wedge 21 is preferably struck out of the locking position by means of a blow from beneath with for example a hand tool such as a hammer against a lower end 38 of the locking wedge 21, possibly followed by lifting the locking wedge 21 by hand if required until it has reached its upper end position. The uppermost end position is reached when a lower contact end of the elongated hole 36 of the locking wedge 21 contacts the rivet 48. Upon withdrawal of the first wedge surface 37, the first clamping part 20 is free to swing down and rearwards due to its own weight. Further, the supporting surface 35 of the wedge rest 34 will return to the position below the lower end 38 of the locking wedge 21, after which the locking wedge 21 may rest stabile in the release/unlocked position of the coupling member 2. The second clamping part 22 is also unlocked as the locking wedge 21 is now in the release position, and the second clamping part 22 is free to slide rearwards. Again, the assembly of the coupling member 2 in the unlocked/released position can be seen in the FIGS. 2 & 4. Further, after both the first and second clamping parts, 20, 22 are loosened, the hook-shaped coupling part 7 can easily be lifted out of the gripping part 6. In this way, a highly compact, robust, reliable, high safety and easy to use coupling member/system 2, 100 can be achieved.

The side parts 7a, 7b of the hook-shaped coupling part 7, the second clamping part 22, and the locking wedge 21 are preferably formed of steel by forging for the purpose of increasing material strength, providing a stiffer coupling member 2, and minimizing the risk of cracking under impact. High strength is especially important for the forward end of the hook-shaped coupling part 7 that is arranged to protrude downwardly into the space 6a of the gripping part 6 and to present the main load-carrying structure of the coupling member 2, because a failure thereof will likely result in significant safety risks. The side parts 20a, 20b of the first clamping part 20, the connector part 32, and wedge-rest part 34 are all preferably formed by relatively thick sheet steel, preferably between 3-5 mm thick, resulting in high strength and cost-effective manufacturing. The first clamping part 22 is assembled by welding the side parts 20a, 20b, connector part 32, and wedge rest part 34 together.

Reference signs mentioned in the claims should not be seen as limiting the extent of the matter protected by the claims, and their sole function is to make claims easier to understand.

As will be realised, the invention is capable of modification in various obvious respects, all without departing from the scope of the appended claims. Accordingly, the drawings and the description thereto are to be regarded as illustrative in nature, and not restrictive.

TABLE OF REFERENCE SIGNS

1 Scaffold
2 Coupling member
3 Upright
4, 5 Scaffolding element
6 Gripping part
6a Space of gripping part
7 Hook-shaped coupling part
7a, 7b Side part of hook-shaped coupling part
8 Gripping surface
9 Enveloping surface
10 Wall
10a Second tightening surface of gripping part
11 First tightening surface of gripping part
12 Bottom of gripping part
14 Pivoting axis
15 Hole of each side part of the hook-shaped coupling part
16 Trough-going cavity of hook-shaped coupling part
18 Fastening portion of hook-shaped coupling part
19 Locking arrangement
20 First clamping part
20a, 20b Side part of first clamping part
21 Wedge-shaped locking part
22 Second clamping part
22a, 22b Side portion of second clamping part
23 Upper portion of hook-shaped coupling part
24 Resting surface of gripping part
25 Resting surface of hook-shaped coupling part
27 Cavity of first clamping part
29 Fastening means of each side part of the first clamping part
30a, 30b, 31a, 31b Tightening surface of first clamping part
32 Connector part of first clamping part
34 Wedge rest part of first clamping part
35 Resting surface of first clamping part
36 Elongated hole of wedge-shaped locking part
37 First wedge surface of wedge-shaped locking part
38 Lower end of wedge-shaped locking part
39 Fold line of side part
42a, 42b External recess of hook-shaped coupling part
43 Front part of second clamping part
44 Forwards facing tightening surface of second clamping part
44a Lateral ridge
45 Rearwards facing tightening surface of second clamping part
46 Second wedge surface of wedge-shaped locking part
47 Rear part of first clamping part
48 Rivet
49 Top part of wedge-shaped locking part
50 First forwards facing support surface
51 Second forwards facing support surface
52 First support projection
53 Second support projection
54 First rearwards facing tightening surface
55 Second rearwards facing tightening surface
56 Central portion of wedge-shaped locking part
57 Peripheral flange portion of wedge-shaped locking part
58 Front wall
59 Rear wall
60 Weld
61 Chamfered front wall portion 62 Chamfered rear wall portion
100 Coupling system

The invention claimed is:
1. Coupling member for coupling scaffolding elements to uprights, said coupling member having a longitudinal direction and a height direction, said coupling member comprising:
   a hook-shaped coupling part arranged to be hooked into a gripping part of said upright; and
   a locking arrangement switchable between a locking position, in which said coupling member may be secured to said upright, and a release position, in which said coupling member may be released from said upright,
   wherein said locking arrangement comprising:
   a first clamping part that is pivotally attached to said hook-shaped coupling part about a pivoting axis, and arranged to, in said locking position, interact with at least one of said upright and said gripping part for tightening coupling between said coupling member and said upright; and
   a wedge-shaped locking part which is slidable between a locking position and a release position, said wedge-shaped locking part being arranged to, during motion from said release position to said locking position, by means of wedge action push said first clamping part towards said upright and said gripping part for interaction with at least one thereof, and
   wherein said first clamping part comprises two transversally spaced apart side parts which jointly define a cavity therebetween;
   said first clamping part is arranged externally on said hook-shaped coupling part, such that said hook-shaped coupling part is arranged at least partly within said cavity;
   each of said two side parts comprises a fastening device for said pivotal attachment of said first clamping part to said hook-shaped coupling part,
   upon tightening of the coupling member, a first forward facing support surface of the hook-shaped coupling part is arranged to interact with a first rearward facing tightening surface of said wedge-shaped locking part to achieve said wedge action,
   said first forward facing support surface is positioned forward of said pivoting axis, and
   the first rearward facing tightening surface of said wedge-shaped locking part is a surface of an outer peripheral flange portion of the wedge-shaped locking part with increased thickness in a thickness direction of the wedge-shaped locking part compared with the thickness of a central portion of the wedge-shaped locking part, the thickness direction being the direction perpendicular to a primary plane of the wedge-shaped locking part extending both in the longitudinal direction and the height direction of the coupling member, and
   the outer peripheral flange portion of the wedge-shaped locking part with increased thickness comprises a forward side flange portion located at an outer peripheral portion of the wedge-shaped locking part on a forward side of the wedge-shaped locking part, a rear side flange portion located at an outer peripheral portion of the wedge-shaped locking part on a rear side of the wedge-shaped locking part, and a top side flange portion connecting the forward side flange portion and the rear side flange portion and located at an outer peripheral portion of the wedge-shaped locking part on a top side of the wedge-shaped locking part.

2. Coupling member according to claim 1, wherein said hook-shaped coupling part comprises a resting surface which in a use position faces downwards and being arranged to interact with said gripping part of said upright, and said pivoting axis in the use position is arranged below said resting surface of said hook-shaped coupling part.

3. Coupling member according to claim 1, wherein each of said two transversally spaced apart side parts comprises at least one tightening surface for said interaction with at least one of said upright and said gripping part.

4. Coupling member according to claim 1, wherein the first clamping part further comprises a connector part that is fixedly connected with each of said transversally spaced apart side parts, such that a single rigid first clamping part is formed.

5. Coupling member according to claim 4, wherein the first clamping part further comprises a wedge rest part that is fixedly connected to said connector part, and said wedge rest part comprises a resting surface for the wedge-shaped locking part to rest on in an unlocked position of the coupling member.

6. Coupling member according to claim 1, wherein said wedge-shaped locking part is arranged to, in said release position, be supported by a portion of said first clamping part.

7. Coupling member according to claim 1, wherein said locking arrangement further comprises a second clamping part, which in a use position is arranged on an upper portion of said hook-shaped coupling part.

8. Coupling member according to claim 7, wherein said second clamping part is slidable between a locking position and a release position, said wedge-shaped locking part being arranged to, during motion from said release position to said locking position, by means of wedge action push said second clamping part towards said upright for interaction therewith.

9. Coupling member according to claim 7, wherein said second clamping part comprising two side portions, and said second clamping part is slidably coupled through said two side portions to a pair of external recesses provided on the hook-shaped coupling part.

10. Coupling member according to claim 7, wherein said first and second clamping parts are separately mounted on said hook-shaped coupling part, and free from direct mutual contact.

11. Coupling member according to claim 7, wherein said second clamping part is slidably coupled to said hook-shaped coupling part.

12. Coupling member according to claim 7, wherein said second clamping part is slidably coupled to an external surface of said hook-shaped coupling part.

13. Coupling member according to claim 1, wherein said wedge-shaped locking part comprises an elongated hole, which extends essentially in a longitudinal direction of said wedge-shaped locking part.

14. Coupling member according to claim 1, wherein each of said transversally spaced apart side parts is formed of a metal plate.

15. Coupling member according to claim 1, wherein said hook-shaped coupling part is formed of two hook-shaped side parts that are joined together.

16. Coupling member according to claim 15, wherein said wedge-shaped locking part is arranged partly between said two hook-shaped side parts of said hook-shaped coupling part, and said wedge-shaped locking part is arranged partly within said cavity of said first clamping part.

17. Coupling system comprising a coupling member according to claim 1, and an upright having at least one gripping part, wherein said gripping part exhibits a resting surface which in a use position faces upwards, and the hook-shaped coupling part exhibits a resting surface which in the use position faces downwards, and the hook-shaped coupling part is arranged to be supported by interaction between the said resting surfaces.

18. Coupling system according to claim 17, wherein said gripping part exhibits a second tightening surface present on an outer periphery of said gripping part, which second tightening surface in the use position faces at least partly downwards, and said first clamping part comprises at least one tightening surface, which in a locked position of said locking arrangement faces at least partly upwards, such that said coupling system may be tightened and secured in the locked position by interaction between said second tightening surface of said gripping part and said tightening surface of said first clamping part.

* * * * *